United States Patent [19]

Bolondi

[11] Patent Number: 4,915,333

[45] Date of Patent: Apr. 10, 1990

[54] EASILY ORIENTABLE SUPPORT FOR OPTICAL AND PHOTOGRAPHIC INSTRUMENTS AND THE LIKE

[76] Inventor: Ivano Bolondi, Via A. Volta, 2, Montecchio (Reggio Emilia), Italy

[21] Appl. No.: 131,825

[22] Filed: Dec. 11, 1987

[30] Foreign Application Priority Data

Dec. 23, 1986 [IT] Italy .............................. 34952/86[U]

[51] Int. Cl.⁴ .......................................... F16M 11/14
[52] U.S. Cl. ................................... 248/181; 248/288.5; 354/293
[58] Field of Search ............... 248/181, 182, 179, 180, 248/177, 288.5; 354/293, 294

[56] References Cited

U.S. PATENT DOCUMENTS

| | | | |
|---|---|---|---|
| 3,737,130 | 6/1973 | Shiraishi | 248/181 |
| 3,814,369 | 6/1974 | Kastholm et al. | 248/578 |
| 3,924,828 | 12/1975 | Epperson | 248/179 |
| 4,329,041 | 5/1982 | Madge et al. | 354/293 |
| 4,640,481 | 2/1987 | Kohno | 354/293 X |

FOREIGN PATENT DOCUMENTS

| | | | |
|---|---|---|---|
| 612723 | 4/1935 | Fed. Rep. of Germany | 248/181 |
| 635871 | 9/1936 | Fed. Rep. of Germany | 248/181 |
| 184634 | 6/1936 | Switzerland | 248/177 |
| 618296 | 2/1949 | United Kingdom | 248/181 |

Primary Examiner—Alvin C. Chin-Shue
Assistant Examiner—David L. Talbott
Attorney, Agent, or Firm—Bucknam and Archer

[57] ABSTRACT

An apparatus for supporting optical and photographic instruments and the like and adjustable in different directions, comprises a bracket (1) which has a resting surface and which is preferably made of soft material (2), a rigid platform located under said surface, a setscrew (4), a ringnut (5) for locking and releasing the optical instrument and a spring (6) located in the setscrew. The apparatus also comprises in the central part a handgrip (7) which has lever (8) inserted therein at fulcrum (9). The lever has a projection which serves as a cam (10) in its lower part. The cam presses on the head of piston (15). By suitable action on the spring it is possible to lock and release the optical or photographic instrument and it is possible to articulate the apparatus in a variety of different positions. The apparatus is safe since no possibility exists for the instrument to fall.

4 Claims, 1 Drawing Sheet

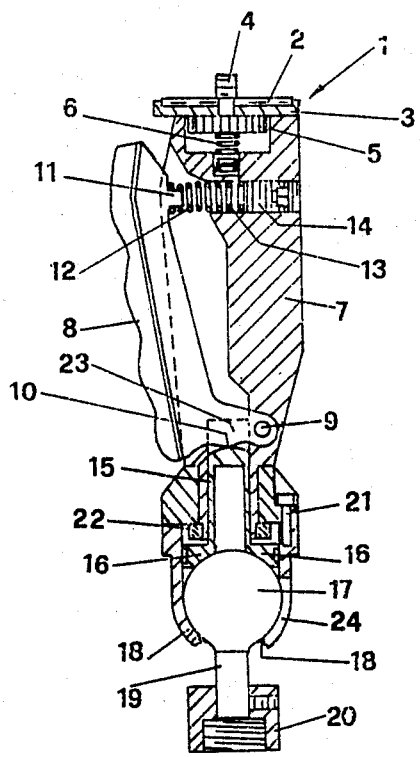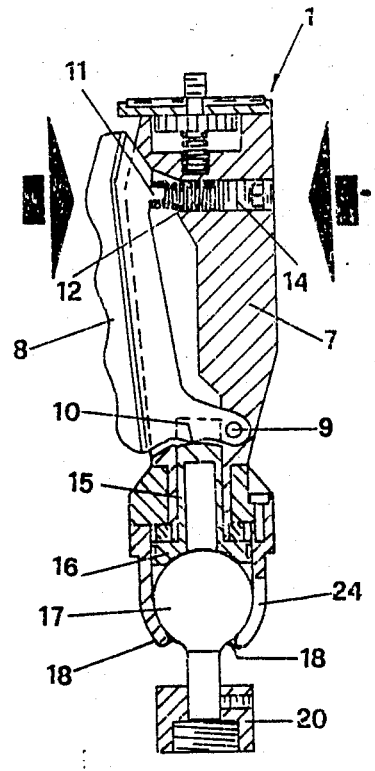
FIG. 1  FIG. 2
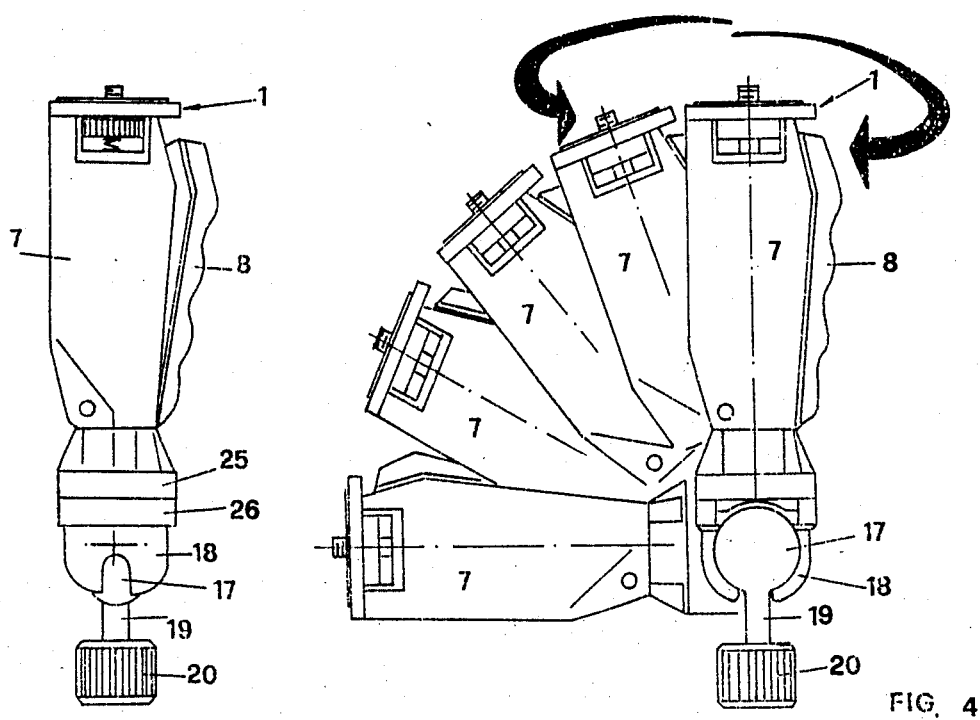
FIG. 3  FIG. 4

EASILY ORIENTABLE SUPPORT FOR OPTICAL AND PHOTOGRAPHIC INSTRUMENTS AND THE LIKE

The present invention relates in general to a support for optical and photographic instruments such as, for instance, photographic equipment, cameras, binoculars, telecameras, the support being easily oriented according to the requirements of the operator and being particularly reliable in ensuring a stability between the base of support and the apparatus which is fixed to it.

In this specific field, apparatuses are known for supporting the equipment, the apparatus being provided with a head which may be unwound and which may be articulated in different directions according to the requirements of the operator. This type of support apparatus, in general, is provided with a bracket for resting and anchoring the optical equipment by means of one or more hinges which may be loosened and locked as required by the operator by means of a suitable control. The apparatuses are also provided with an actuating lever for orienting the integral group of the bracket and the optical equipment and connection means with the base or the support tripod.

These known support apparatuses are affected by the drawback that they are not completely reliable with respect to the blocking of the hinge or hinges because, if the operator does not sufficiently tighten the blocking device, an uncontrollable rotation may occur, or the optical apparatus which was supported on it may fall with serious consequences, particularly in view of the sensitivity of the optical apparatuses.

An object of the present invention is to provide a supporting apparatus which eliminates the drawbacks mentioned hereinabove, which drawbacks are well known to operators in this field.

Another object is to provide an apparatus which permits to correct rapidly the position of the optical instrument being supported.

Still another object is to provide a supporting apparatus which permits to lay the equipment accurately on it and which may be adapted to several fields.

The present invention may be further clarified by reference to the accompanying drawings of which:

FIG. 1 shows the apparatus in a blocked position.

FIG. 2 shows the same apparatus in position of free orientation with the two black arrows showing the opposite force being exerted by the hand of the operator.

FIG. 3 is an external view of the apparatus in the blocked position of FIG. 1.

FIG. 4 illustrates by way of an example all the different degrees of articulation which may be obtained during the orientation of the apparatus, that is, under the unwinding condition shown in FIG. 2.

By reference to the figures, numeral 1 designates a conventional bracket capable of supporting and anchoring the optical instrument. The bracket consists of a resting surface 2 which is preferably made of soft material, a rigid platform 3 for resting the apparatus, a set-screw 4 with a large ringnut 5, for anchoring and releasing the optical instrument and spring 6 within the screw 4.

Numeral 7 designates a hand grip which constitutes the central part of the apparatus and which is preferably shaped in an anatomical form. Numeral 8 designates a lever which is inserted in the handgrip 7 at the point 9 which acts as a fulcrum. The lever has a projection cam 10 in the lower part.

Numeral 11 designates a tooth which engages one end of compressed spring 12 which is located in seat 13 of the handgrip, the spring reacting at the other end on a threaded pallet of registration 14.

Numeral 15 designates a piston which is broader at the base, forming a bell 16 intended to engage the upper surface of the fixed spherical body 17 while the lower surface of the same spherical body 17 is engaged with the lower border 18 of the apparatus, which border has the shape of a bonnet and is suitably narrower at the bottom. This piston 15 may slide within cylindrical seat 23 of the handgrip.

Stem 19 provides a connection between the spherical body 17 and the anchoring ringnut 20 which is connected with a conventional fixed support such as a tripod. The screw 21 and the threaded ring 22 provide, together with other screws similar to screw 21 which are not shown in the figure, the release and the blocking again of the apparatus and illustrates merely constructive requirements because they permit to join the bonnet 18 to the handgrip 7.

A vertical slit 24 is formed on the bonnet 18, the slit having a width slightly greater than the diameter of the stem 19. Numeral 25 is a flange integral with the handgrip. The flange is movable with respect to the ring 26 which is integral with bonnet 18.

The apparatus operates as follows: when the apparatus is not gripped, as shown in FIG. 1, the spherical joint 17 is integral with the handgrip 7 due to the effective pinch constituted by the grip on the fixed spherical body 17 which is exerted in the upper part by the bell 16 and in the lower part by the bonnet 18. The force which is exerted between bell 16 and spherical body 17 is caused by the pressure of cam 10 on the head of the piston 15 and finally is applied through a suitable lever arm by spring 12 which acts at point 11 on lever 8. The force which is exerted on the lower part of the fixed spherical body 17 of the bonnet 18 constitutes the bank reaction of the force exerted by bell 16 on the upper part of the same spherical body 17.

When the operator exerts an action tending to grip the handgrip 7 and restricting the handgrip by making the lever 8 closer to it, and compressing the spring 12 as shown in FIG. 2 in which the two black arrows represent respectively the force which acts on lever 8 exerted by the fingers of the operator and the relative reaction of the palm of the hand on body 7, cam 10 does not press any longer on the head of piston 15. Therefore, the gripping action exerted on the spherical body 17 stops, the body 17 behaving as an idle hinge with respect to the entire upper part which is integral with hand grip 7.

In this manner it is possible to orient support 1 of the optical apparatus according to broad degrees of articulation which involve, as shown in FIG. 4, the forward inclination, the side inclination, the rearward inclination up to the rotation on the axis itself of the hand grip. When lever 8 is released, it reacquires with all its effectiveness the gripping action on the fixed spherical body 17 in the new position selected by the operator, without requiring the intervention of adjustment means.

As shown in the example, the supporting bracket 1 is positioned in the upper part of handgrip 7, but the invention may be realized with the support bracket 1 positioned on other parts of the handgrip 7 such as, for instance, on the side or on the base of the same in proximity of the bonnet 18 by means of a suitable console projection.

In addition, the device as shown may be utilized in a reverse position in which the ringnut 20 serves as a support of the orienting instrument, while the screw 4 constitutes an engagement on a well-known lower support.

The device according to the present invention has the advantage of adjusting the blocking effectiveness as a function of the weight of the apparatus being supported, which is carried out by adjusting the compression of spring 12 acting on the threaded pallet 14.

The invention has been described in detail with respect to optical instruments, but the apparatus may be applied also for supporting a variety of different apparatuses, such as for instance, microphones, for the articulation of folding chairs, and wherever it is necessary to insure a rapid and reliable blocking/unblocking of an articulating device with hinges.

What is claimed is:

1. An adjustable supporting device suitable for an optical instrument and the like which has a body having a longitudinal axis, the device comprising a block for a hinge, said hinge having a fixed part and a movable part, said fixed part being formed by a ball (17), a stem (19) connected with said ball, said stem (19) being connected to an anchoring ringnut (20) at the bottom of the device, said movable part consisting of springing means (16, 18) and a handgrip (7, 8) mounted along said longitudinal axis, said handgrip comprising two levers articulated on a fulcrum (9) on one of said levers, the other lever having a projection (10) in the lower part thereof, said projection serving as a cam, a compressed spring (12) located in a seat (13) in said handgrip, a tooth (11) engaging one end of said spring (12), the closing force of said springing means on the surface of said ball being exerted by said compressed spring 912) by means of said handgrip, a piston (15) slidable within said handgrip along said longitudinal axis, said piston forming a bell (16) which engages the upper part of said ball, the lower part of said ball engaging with a bonnet (18) formed in the lower border of said device, said bonnet having a vertical slit (24), whereby when the device is blocked, said tooth (10) engages one end of said spring (12), said cam (10) exerts pressure on said piston and on said bell and the ball (17) is locked in position and when said levers (7) and (8) are pressed together, said spring (12) is compressed, the pressure of said cam (10) on said piston is released and said ball is free to move, said handgrip rotates on its axis and the device is articulated forwardly or rearwardly or on the side, at any angle, when the bonnet is in the vertical as well as the horizontal position.

2. The device according to claim 1 wherein at least to one of said levers (7, 8) a supporting platform (1) is connected, said support platform (1) being intended to support and anchor said optical instrument and the like by means of suitable resting means (2) and engaging means (4).

3. The device according to claim 2 wherein the compression of said spring (12) is adjustable by screwing and unscrewing a ringnut (14) coaxial with said spring at one of its ends.

4. A device for supporting an optical instrument and the like and for anchoring said optical instrument in a variety of positions which has a body having a longitudinal axis, the device comprising in the upper part thereof a bracket (1) having a surface (2) for resting said optical instrument, a rigid platform (3) located under said surface (2), a setscrew (4) emerging from said surface, a ringnut (5) for blocking and releasing said optical instrument and a first spring (6) located in said setscrew, said device comprising in the central part thereof a handgrip (7) mounted along said longitudinal axis, a lever (8) inserted in said handgrip at fulcrum (9), said lever (8) having a cam (10) in the lower portion thereof, said lever (8) having a projection (11) in the upper part thereof, a second spring (12) located in the upper part of said handgrip (7), said projection (11) engaging said second spring (12) at one end thereof, said second spring (12) acting at the other end thereof on a threaded pallet (14), said device comprising in the lower part a fix spherical body (17), a piston (15) forming a bell (16) in its lower part, said piston sliding within a cylindrical recess located in said handgrip along said longitudinal axis, said bell engaging the upper part of said spherical body (17), said device having a bonnet-shaped border (18) at the base, the lower part of said fixed spherical body (17) engaging said border, said handgrip being free to rotate in every direction with respect to said border (18) when said projection (11) urges said spring (12) and said bell is not engaged by said piston.

* * * * *